Dec. 7, 1965   G. E. DANIELS   3,221,423
EARTH SCRAPER
Filed Feb. 28, 1963   2 Sheets-Sheet 1
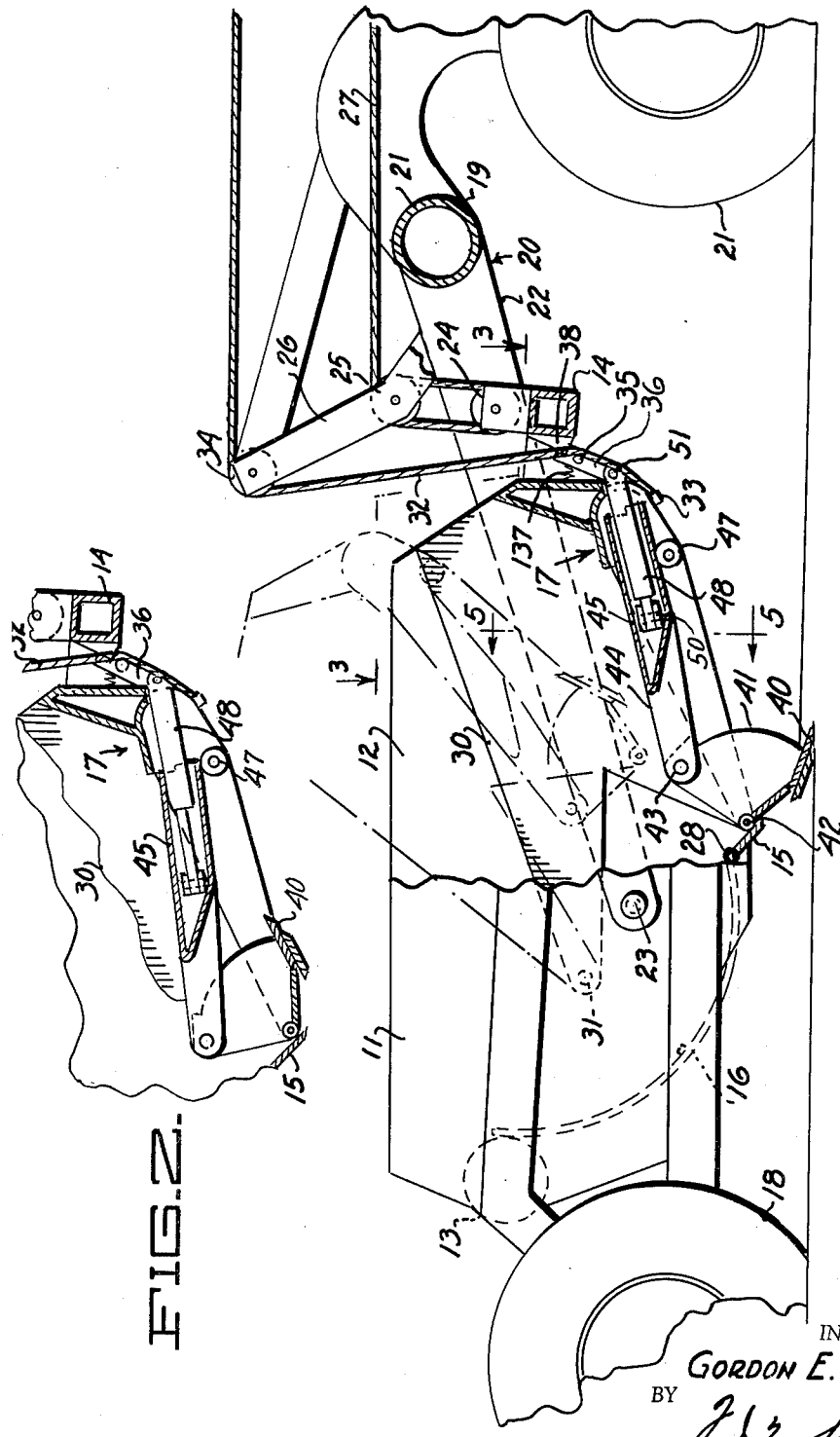
INVENTOR.
GORDON E. DANIELS
BY

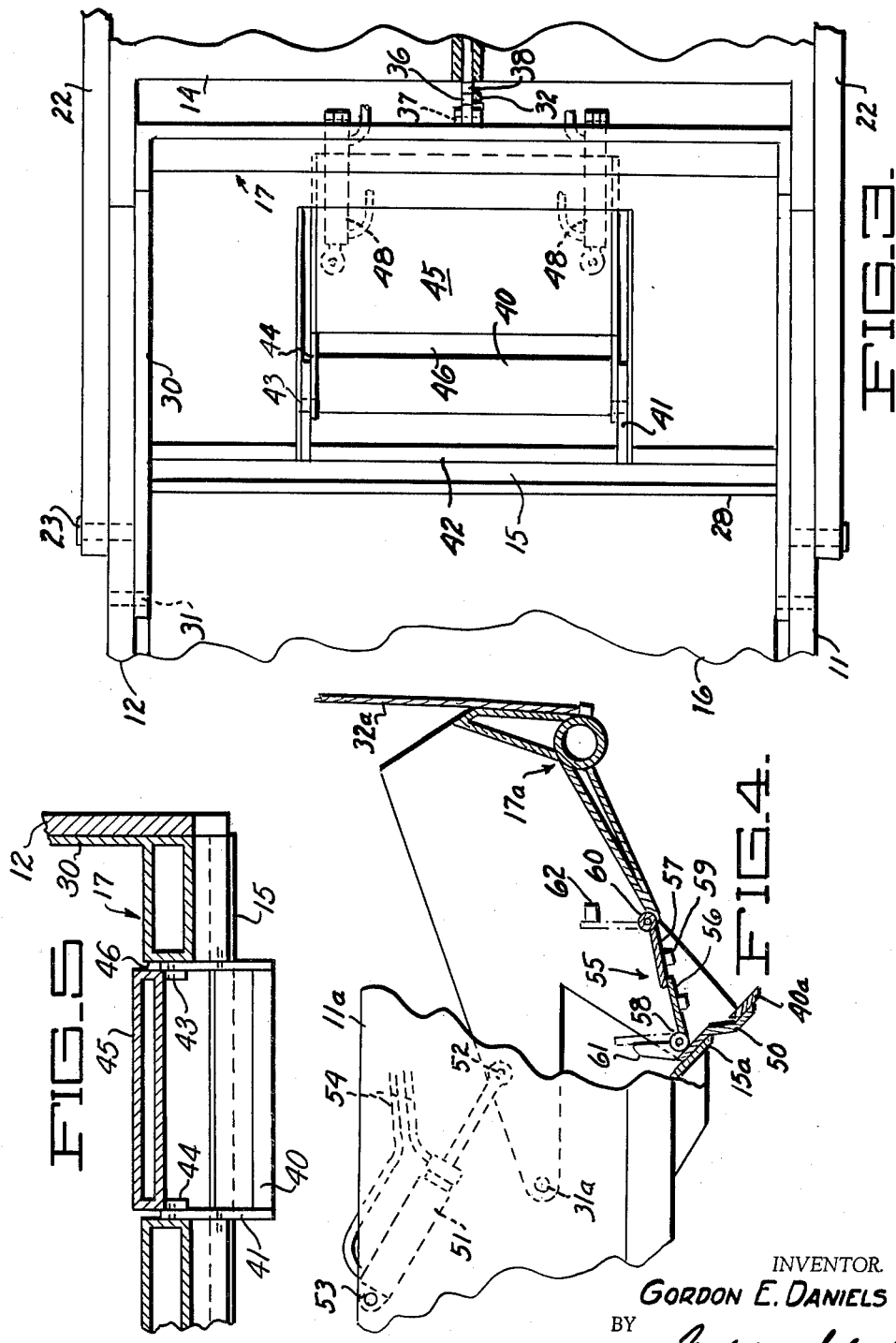

United States Patent Office 3,221,423
Patented Dec. 7, 1965

3,221,423
EARTH SCRAPER
Gordon E. Daniels, 7600 Twining Drive,
Knoxville, Tenn.
Filed Feb. 28, 1963, Ser. No. 261,708
5 Claims. (Cl. 37—126)

This invention relates to earth scrapers of the carry-all type and has particular reference to scrapers having selectively usable scraping blades of different types or lengths, as disclosed in my U.S. Patent No. 2,577,877.

The scraper shown in said patent works generally satisfactorily and is superior to other types of scrapers in that the short blade can be utilized for scraping ordinary materials and for spreading. However, trouble is sometimes encountered in properly controlling the apron and in filling the receptacle when extremely hard or dense material is encountered.

It therefore becomes a principal object of the present invention to effect positive control of the apron in opening and closing the same.

Another object is to provide a closable opening in the apron through which material scraped by the auxiliary blade may be directed and to close such opening when the auxiliary blade is not in use.

Another object is to provide a single control for concurrently closing the opening in the apron and raising the auxiliary blade into inoperative condition relative to the main blade.

Another object is to reduce the loading forces required particularly when handling heavy dense earth materials, such as clay.

The manner in which the above and other objects of the invention are accomplished will be readily understood on reference to the following specification when read in conjunction with the accompanying drawings wherein:

FIG. 1 is a side view, partly in section, of an earth scraper embodying a preferred form of the present invention and illustrating the auxiliary blade in scraping position.

FIG. 2 is a fragmentary sectional view similar to that of FIG. 1 but showing the apron opening closed by the closure member and the auxiliary blade.

FIG. 3 is a sectional plan view of part of the scraper and is taken substantially along the line 3—3 of FIG. 1.

FIG. 4 is a side view, partly in section, of a modified form of the present invention.

FIG. 5 is a sectional view taken substantially along line 5—5 of FIG. 1.

Referring in particular to FIGS. 1 to 3, the scraper comprises side frames 11 and 12 which are held in spaced relation, at least in part, by a rear tubular member 13, a forward cross beam 14 and a main scraper blade 15 which extends the full width of the scraper. The blade 15 is located in position to direct material scraped thereby upwardly into the scraper body, the latter being formed by the side frames 11 and 12, a rear receptacle or bowl 16 and a forward apron generally indicated at 17.

The scraper body is supported at the rear by wheels 18 and at the front by a yoke frame 20 carried by steerable wheels 21.

The scraper is intended to be drawn forwardly by a suitable tractor, not shown, connected in any well known manner to the yoke frame 20.

The yoke frame 20 comprises a tubular cross beam 21 to the ends of which are integrally attached two arms 22 which extend rearwardly adjacent and outside the side frames 11 and 12. These arms terminate in pivotal connections 23 to the scraper side frames.

The forward end of the scraper body is raised and lowered, whereby to vertically adjust the scraper blade 15 relative to the ground, by a cable and sheave arrangement comprising a sheave block 24 carried by the cross beam 14 and a second sheave block 25 carried by truss work 26 supported by the yoke frame 20.

A cable 27 is suitably anchored in a manner not shown to the truss work 26 and is reeved several times around the blocks 24 and 25, and then passes forwardly to a suitable winch, not shown, driven by the tractor under control of the operator.

The receptacle 16 may be of any suitable construction and is shown as comprising an arcuate bowl pivotally supported at 28 and adapted to be rocked clockwise by suitable means, not shown, under control of the operator during dumping or spreading operations.

The apron 17 is provided with rearwardly extending sides 30 fitting within the side frames 11 and 12 and pivotally connected thereto at 31.

The apron 17 is arranged to be raised and lowered between its full and dot-dash line positions shown in FIG. 1 by a cable 32 anchored to the apron at 33 and passing over a sheave 34 on the truss work 26 from whence it is guided forwardly to a suitable winch, not shown, driven by the tractor under control of the operator.

It will be noted that the cable 32 passes around a pin 35 mounted on a latch 36 which is pivoted at 37 (see also FIG. 3) to the apron. The latch is normally held in its position shown by a compression spring 137 extending between the same and the apron to hold the same in latching engagement with a lug 38 carried by the beam 14. When the cable is drawn to raise the apron toward its dot-dash line position it will first rock the latch 36 counterclockwise against the action of spring 137 to release the same from the lug 38 whereby the apron can be raised to a desired position.

A short auxiliary blade 40 is carried by side flanges 41 pivotally supported by a rod 42 rockably carried by the arms 30 of the apron. The flanges 41 are also pivoted at 43 to rearwardly extending arms 44 of a closure member 45. The latter has a flat upper surface movable through an opening 46 in the apron 17 and is supported for endwise movement by rollers 47 carried by the apron.

For the purpose of moving the closure member fore and aft, a pair of double acting hydraulic actuators 48 are provided, the pistons of which are pivoted at 50 to the closure member and the cylinders of which are pivoted at 51 to the apron. Pivots 51 are coaxial with the pivotal support 37 for the latch 36.

Hydraulic fluid is selectively applied to either end of the cylinders of the actuators in any well known manner (not shown) under control of the scraper operator to extend or contract the closure member in the opening and to raise or lower the auxiliary scraper blade.

In operation, when it is desired to scrape hard or dense material such as clay, the operator raises the scraper body sufficiently by cable 27 to permit lowering the apron 17 to its lowermost position shown in FIG. 1 wherein the shaft 42 rests on the main blade 15 and wherein the apron becomes positively held by latch 36 from rising. Also, he applies fluid pressure to the cylinders 48 in a direction to retract the closure member into its position shown in FIG. 1 and concurrently swing the auxiliary blade downward into its position shown where it extends below the main blade 15. The body is then lowered by cable 27 causing the auxiliary blade to engage the ground. Now, as the scraper is drawn forwardly the auxiliary blade becomes effective to direct material into the body and because of the shorter length of the auxiliary blade, the draw bar pull will be proportionately smaller and the material will be directed upwardly through the opening 46 and onto the rear bowl 16 and the apron 17. When the scraping operation is completed the operator causes operation of the hydraulic actuators 48 to extend the closure member and raise the auxiliary blade 40 into their positions shown in FIG. 2 where they, together, effectively close the opening in the apron. When it is desired to dump or spread the scraped material, the cable 32 is operated to raise the apron relative to the main blade 15 and the rear bowl 16 is suitably rocked forwardly, causing material to spill out over the main blade.

In the event the texture of the material to be scraped is such as to permit the longer main blade 15 to be used or when it is desired to cut directly adjacent a bank, ledge or the like, the closure member 45 and auxiliary blade 40 are held in their positions shown in FIG. 2 and the apron 17 is raised to provide a suitable opening between the main blade and the shaft 42 carrying the auxiliary blade. In this condition, the scraper body is adjusted until the blade 15 assumes contact with the ground.

Referring now to the modified form shown in FIG. 4, a main blade 15a is supported between side frames, i.e. 11a, in the same manner as that shown in FIG. 1. However, a short auxiliary blade 40a is suitably attached to a cross piece 50 integral with the rearwardly extending sides of an apron 17a somewhat similar to the apron 17. The auxiliary blade 40a is of a length similar to that of blade 40.

When the apron 17a is in its lowermost position shown in FIG. 4, the auxiliary blade 40a extends below the main blade 15a wherein it is effective to be moved into scraping contact with the ground by lowering of the scraper body. The apron 17a is pivoted at 31a to the side frames 11a, etc., and may be positively raised and lowered by an hydraulic actuator 51 whose piston is pivoted to the apron at 52 and whose cylinder is pivoted to a respective side frame at 53. Fluid under pressure may be applied to either of two hydraulic lines 54 under control of the operator so as to cause the actuator to raise or lower the apron. In this case, the apron is positively held in its lowermost position by application of fluid pressure to the upper rear end of the actuator 51 so that the auxiliary blade may be forced into scraping contact of the ground by the weight of the whole scraper body.

The apron 17a has an opening 55 normally closed by overlapping doors or chute member 56 and 57. The latter are pivoted at 58 and 60, respectively, and are prevented from dropping below their illustrated full line positions by lugs 59 extending from the sides of the apron.

When the auxiliary blade 40a is used, material scraped thereby is directed upwardly against the doors 56 and 57 moving the same to their vertical dot-dash line positions where they are limited by lugs 61 and 62. In this condition, the material slides upwardly along the doors into the scraper body. Due to the smooth surfaces of the doors, scraped material, even clay, or the like, easily slides upwardly into the body and thus does not clog the opening above the blade as it otherwise would tend to do if such doors were not utilized because of the sticky consistency of certain types of materials and the considerable friction between two sections of such material.

When the apron is raised or the scraping operation otherwise stopped, the doors will tend to close so as to retain the scraped material from spilling back over the auxiliary blade.

Having thus described the invention, what I desire to secure by United States Letters Patent is:

1. An earth scraper comprising the combination with a scraper body adapted to be moved along the ground and comprising a receptacle; and a scraper blade adapted to direct material scraped thereby into said receptacle during movement of said body; of an apron mounted in front of said receptacle, a second scraper blade supported by said apron, said apron having an opening therein, means on said apron for moving said second blade relative to said apron from a position below said first blade wherein said second blade is effective to direct material through said opening and into said receptacle to a position wherein said second blade at least partly closes said opening, and means for bodily moving said apron away from said first blade whereby to render said first blade effective to direct material into said receptacle.

2. An earth scraper comprising the combination with a scraper body adapted to be moved along the ground and comprising a receptacle; and a scraper blade adapted to direct material scraped thereby into said receptacle during movement of said body; of an apron mounted in front of said receptacle, said apron having an opening therein, a second scraper blade carried by said apron for movement thereon, means for moving said apron from a first position wherein said second blade is below said first blade whereby to direct material upwardly through said opening to a second position wherein said second blade is spaced above said first blade, a closure member carried by said apron, and means including selectively operable power means carried by said apron for moving said closure member from a position at least partly uncovering said opening to a position closing a portion of said opening and means for moving said second blade on said apron to a position at least partially closing said opening.

3. An earth scraper comprising the combination with a scraper body adapted to be moved along the ground and comprising a receptacle; and a scraper blade adapted to direct material scraped thereby into said receptacle during movement of said body; of an apron mounted in front of said receptacle, said apron having an opening therein, a second scraper blade carried by said apron, means for moving said apron from a first position wherein said second blade is below said first blade whereby to direct material upwardly through said opening to a second position wherein said second blade is spaced above said first blade, a closure member carried by said apron, and means including selectively operable power means for concurrently moving said second blade on said apron to a position partly closing said opening and for moving said closure member from a position at least partly uncovering said opening to a position at least partly closing said opening.

4. An earth scraper according to claim 3 wherein said second blade is shorter than said first blade.

5. An earth scraper according to claim 4 wherein said closure member is movable forwardly and rearwardly between said first and second mentioned positions thereof.

References Cited by the Examiner
UNITED STATES PATENTS

| | | | |
|---|---|---|---|
| 2,443,492 | 6/1948 | Austin | 37—141 |
| 2,514,091 | 12/1950 | Renaud | 37—129 |
| 2,577,877 | 12/1951 | Daniels | 37—126 |
| 3,011,274 | 12/1961 | Richter | 37—141 |
| 3,092,919 | 6/1963 | Reynolds | 37—117.5 X |
| 3,108,388 | 10/1963 | Johnson | 37—126 |

ABRAHAM G. STONE, *Primary Examiner.*

BENJAMIN HERSH, WILLIAM A. SMITH III,
*Examiners.*